US012671693B2

(12) United States Patent
Brannon et al.

(10) Patent No.: US 12,671,693 B2
(45) Date of Patent: Jun. 30, 2026

(54) DATA TRANSFER DISCOVERY AND ANALYSIS SYSTEMS AND RELATED METHODS

(71) Applicant: OneTrust, LLC, Atlanta, GA (US)

(72) Inventors: Jonathan Blake Brannon, Smyrna, GA (US); Kevin Jones, Atlanta, GA (US)

(73) Assignee: One Trust, LLC, Atlanta, GA (US)

( * ) Notice: Subject to any disclaimer, the term of this patent is extended or adjusted under 35 U.S.C. 154(b) by 167 days.

(21) Appl. No.: 18/549,465

(22) PCT Filed: Mar. 8, 2022

(86) PCT No.: PCT/US2022/019358
§ 371 (c)(1),
(2) Date: Sep. 7, 2023

(87) PCT Pub. No.: WO2022/192269
PCT Pub. Date: Sep. 15, 2022

(65) Prior Publication Data
US 2024/0311497 A1　　Sep. 19, 2024

Related U.S. Application Data

(60) Provisional application No. 63/158,174, filed on Mar. 8, 2021.

(51) Int. Cl.
| | |
|---|---|
| *H04L 9/40* | (2022.01) |
| *G06F 21/60* | (2013.01) |
| *G06F 21/64* | (2013.01) |

(52) U.S. Cl.
CPC .......... *H04L 63/102* (2013.01); *G06F 21/604* (2013.01); *G06F 21/645* (2013.01); *H04L 63/0876* (2013.01)

(58) Field of Classification Search
CPC .............. H04L 63/102; H04L 63/0876; H04L 63/1425; H04L 63/1433; G06F 21/604; G06F 21/645; G06F 21/577; G06F 21/552
See application file for complete search history.

(56) References Cited

U.S. PATENT DOCUMENTS

| | | | |
|---|---|---|---|
| 11,863,563 B1 * | 1/2024 | Rungta ................ | H04L 63/102 |
| 2007/0061125 A1 * | 3/2007 | Bhatt .................. | H04L 63/0227 |
| | | | 703/23 |

(Continued)

OTHER PUBLICATIONS

PCT Application No. PCT/US2022/019358 International Search Report and Written Opinion of the International Searching Authority dated Jun. 22, 2022.

*Primary Examiner* — Khoi V Le
(74) *Attorney, Agent, or Firm* — Ballard Spahr LLP

(57) ABSTRACT

In various aspects, a data transfer discovery and analysis system may query an entity computing system to identify access credentials for third-party computing systems and scan each access credential to determine associated permissions provided by each access credential on the entity computing system. The data transfer discovery and analysis system may further inspect access logs to identify actual data transfers between the entity computing system and third-party computing systems as well as other access activity associated with each of the credentials. The system can generate and store a mapping of all actual data transfers (e.g., based on the access log data) and potential data transfers (e.g., based on particular access permissions) between/among the entity computing system and the third-party computing systems. By analyzing access logs to determine actual data transfers executed under each particular (Continued)

access credential, the data transfer discovery and analysis system can identify unused and/or underutilized access permissions.

20 Claims, 10 Drawing Sheets

(56) References Cited

U.S. PATENT DOCUMENTS

| | | | |
|---|---|---|---|
| 2012/0124640 A1* | 5/2012 | Bender | ............... G06F 21/6218 |
| | | | 726/1 |
| 2014/0033288 A1* | 1/2014 | Wynn | ................... H04W 48/18 |
| | | | 726/7 |
| 2017/0286700 A1* | 10/2017 | Sartor | ................. H04L 63/0823 |

\* cited by examiner

300

To view and manage your registrations for converged applications, please
*Application Console.*

| Search by name or AppId | 320 | 330 |

310

| DISPLAY NAME | APPLICATION TYPE | APPLICA |
|---|---|---|
|  WE  WebApp-msaccounttest.azurewet | Web app / API | 266680 |
| TE  testoutlook2 | Web app / API | d31d22 |
| HE  HealthCareClient | Native | 6d7b45 |
| PR  ProposalTracker | Web app / API | f54009 |
| WE  websdksamplescc | Web app / API | 929c46 |
| ME  metioHealthcare | Web app / API | c9b918 |
| ME  metiohealthcareNoCC | Web app / API | 4c3b2c |
| TR  TrustedAppAPI2 | Web app / API | 2630cd |
| VS  VSO.ritesp.25944149-e266-4689-a | Web app / API | ce61d8 |
| WE  WebMetiobankAgent | Web app / API | 3f9757 |
| TR  TrustedAppMetiohealthcare | Web app / API | 74b4c8 |
| BT  Bvd Test Application | Web app / API | 760dc6 |
| TE  test | Web app / API | 836504 |
| OU  outlooklocal | Web app / API | 38bd84 |

| 410 | 420 | 430 |
|-----|-----|-----|

| API / Permission name | Type | Description |
|---|---|---|
| ∨  Azure Active Directory Graph (T) | | |
| User Read | Delegated | Sign in and read user profile |
| ∨  Azure Service Management (T) | | |
| User_impersonation | Delegated | Access Azure Service Management as organization u |
| ∨  Dynamics CRM (T) | | |
| User_impersonation | Delegated | Access Common Data Service as organization users |
| ∨  Microsoft Graph (14) | | |
| AccessReview.Read.All | Application | Read all access reviews |
| AccessReview.ReadWrite.All | Application | Manage all access reviews |
| AdministrativeUnit.Read.All | Application | Read all administrative units |
| AdministrativeUnit.ReadWrite | Application | Read and write all administrative units |
| Application.ReadWrite.All | Application | Read and write all applications |
| Application.ReadWrite.Owned | Application | Manage apps that this app creates or owns |
| Contacts.Read | Application | Read contacts in all mailboxes |
| Contacts.ReadWrite | Application | Read and write contacts in all mailboxes |
| Directory.Read.All | Application | Read directory data |
| Files.Read.All | Application | Read files all site collections |
| Files.ReadWrite.All | Application | Read and write files in all site collections |
| Sites.FullControl.All | Application | Have full control of all site collections |
| Sites.Manage.All | Application | Create, edit, and delete items and lists in all site colle |
| Sites.Read.All | Application | Read items in all site collections (preview) |

User.Read

Microsoft Graph                                                        ✕

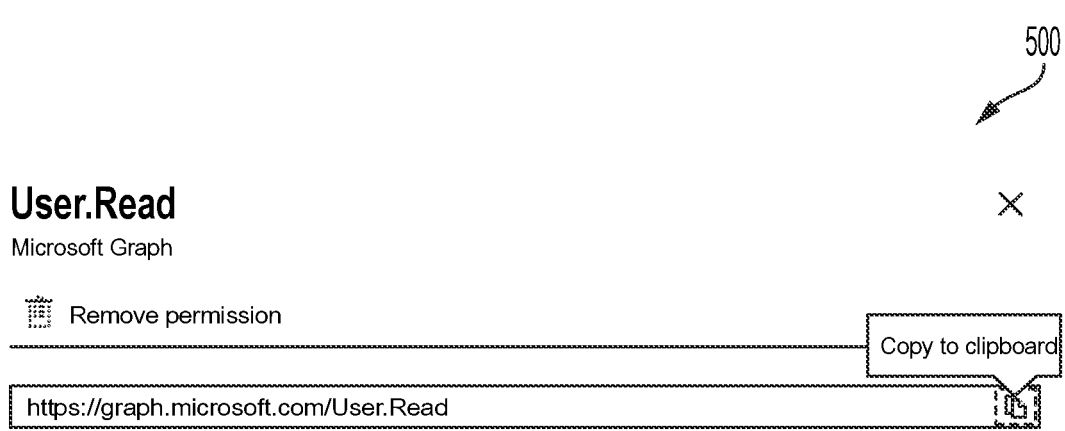

Remove permission

Copy to clipboard https://graph.microsoft.com/User.Read

Admin consent required

No

Admin consent display name

Sign in and read user profile

Admin consent description

Allows users to sign-in to the app, and allows the app to read the profile of signed-in users. It also allows the app to read basic company information of signed-in users.

User consent display name

Sign you in and read user profile

User consent description

Allows you to sign in to the app with your organizational account and let the app read your profile. It also allows the app to read basic company information.

INSPECT ACCESS LOGS TO IDENTIFY OBJECTS
ACCESSED USING CREDENTIAL(S)

720

DETERMINE TYPE OF DATA STORED AT THE ACCESS
LOCATION

730

DETERMINE ACCESS ACTIVITY FOR EACH CREDENTIAL

740

STORE METADATA FOR EACH CREDENTIAL INDICATING
IDENTIFIED OBJECTS, TYPE OF DATA ACCESSED, AND
ACCESS ACTIVITY

750

OPTIONALLY MODIFY CREDENTIALS AND/OR
PERMISSIONS BASED ON ACCESS ACTIVITY

800

| Username | IP Address | User Agent | Timestamp |
|---|---|---|---|
| jsmith@onetrust.xyz | 354.126.152.80 | Chrome \| 87.0.4280.88 \| Mac OS X | 01/25/2021 02:11 PM |
| janedoe@onetrust.xyz | 336.55.179.13 | Safari \| 605.1.15 \| macOS | 01/25/2021 12:17 PM |
| janedoe@onetrust.xyz | 336.55.179.13 | Safari \| 605.1.15 \| macOS | 01/22/2021 10:44 AM |
| janedoe@onetrust.xyz | 336.55.179.13 | Safari \| 605.1.15 \| macOS | 01/20/2021 02:07 PM |
| janedoe@onetrust.xyz | 336.55.179.13 | Safari \| 605.1.15 \| macOS | 01/20/2021 08:28 AM |
| jsmith@onetrust.xyz | 354.126.152.80 | Chrome \| 87.0.4280.88 \| Mac OS X | 01/19/2021 01:39 PM |
| janedoe@onetrust.xyz | 336.55.179.13 | Safari \| 605.1.15 \| macOS | 01/19/2021 09:04 AM |
| jsmith@onetrust.xyz | 384.60.246.194 | Chrome \| 87.0.4280.88 \| Mac OS X | 01/15/2021 12:34 PM |
| janedoe@onetrust.xyz | 336.55.179.13 | Safari \| 605.1.15 \| macOS | 01/14/2021 09:27 PM |
| janedoe@onetrust.xyz | 336.55.179.13 | Safari \| 605.1.15 \| macOS | 01/14/2021 09:22 PM |

DATA TRANSFER DISCOVERY AND ANALYSIS SYSTEMS AND RELATED METHODS

CROSS-REFERENCE TO RELATED APPLICATIONS

This application claims the benefit of U.S. Provisional Patent Application Ser. No. 63/158,174, filed Mar. 8, 2021, which is hereby incorporated herein by reference in its entirety.

TECHNICAL FIELD

The present disclosure involves computer-implemented systems and processes for protection of system software or data from destruction, unauthorized modification, and/or unauthorized access by, for example, identifying and classifying access permissions between computing systems.

BACKGROUND

A significant challenge encountered by many organizations is mitigating risks associated with accessing third-party computing systems with an entity computing system and/or providing access to the entity computing system by third-party computing systems. For example, many entities may utilize computing functionality provided by a third-party computing system (e.g., data storage, software capability, etc.). Although the interaction (e.g., network communication) between the entity computing system and third-party computing system may require authorized credentials or other authentication, providing access to an entity computing system by a third-party computing system (e.g., or accessing a third-party computing system by the entity computing system) can expose data to a signification risk of experiencing some type of data incident involving the data, such as a data breach leading to the unauthorized access of the data, a data loss event, etc. Additionally, as the number of third-party computing systems that an entity computing systems engages with increases, it can be technically challenging to track and manage which third-party computing systems have access to particular data in an entity computing system, and the extent of that access. As such, it can be technically challenging to identify the scope of a data loss incident at a particular third-party computing system. Therefore, a need exists in the art for improved systems and methods for reducing risks associated with such data loss events, while still enabling an entity computing system to utilize computing functionality provided by third-party computing systems and managing and tracking the data access provided to the third-party computing systems via the computing functionality that they provide.

SUMMARY

A method, in accordance with various aspects, comprises: (1) querying, by computing hardware, an entity computing system to identify access credentials granted to third-party computing systems, respectively; (2) analyzing, by the computing hardware, the access credentials to identify access permissions provided by the access credentials, respectively; (3) classifying, by the computing hardware, each access permission by type; (4) storing, by the computing hardware, metadata indicating access permission types for the third-party computing systems, respectively; (5) inspecting, by the computing hardware, access logs to identify particular data objects accessed on the entity computing system by each third-party computing system under a respective access credential for the third-party computing system; (6) determining, by the computing hardware, access activity for each of the access credentials; (7) modifying, by the computing hardware, the metadata to indicate (a) the particular data objects accessed on the entity computing system by each third-party computing system under the respective access credentials and (b) the access activity; and (8) generating, by the computing hardware based on the metadata, a mapping of data transfers between the entity computing system and each third-party computing system, the mapping including (a) a plurality of potential data transfers based on the access permission types and (b) a plurality of actual data transfers based on the access activity.

In some aspects, the method further comprises facilitating execution, by the computing hardware, of a responsive action based on the access activity. In such aspects, facilitating execution of the responsive action may comprise at least one of causing the entity computing system to rescind at least one of the access credentials or causing the entity computing system to modify the respective access permission. In other aspects, facilitating execution of the responsive action comprises providing, by the computing hardware, the mapping of the data transfers to the entity computing system. In various aspects, the method comprises modifying, by the computing hardware, a first access credential of the access credentials in response to determining that the access activity with respect to a first permission type for the first access credential does not exceed a particular activity threshold. In some aspects, modifying the first access credential comprises rescinding an access permission for the first access credential that corresponds to the first permission type. In various aspects, the access activity indicates at least one of an amount of data accessed on the entity computing system by each third-party computing system under the respective access credential, a frequency of data access on the entity computing system by each third-party computing system under the respective access credential, and whether each third-party computing system utilizes the access permissions granted by access credentials, respectively.

In a particular aspect, a first access credential of the access credentials includes a first access permission type and a second access permission type between the entity computing system and a particular third-party computing system of the third-party computing systems, the plurality of potential data transfers include a first potential data transfer between the entity computing system and the particular third-party computing system defined by the first access permission type and a second potential data transfer between the entity computing system and the particular third-party computing system defined by the second access permission type, and the method further comprises identifying, by the computing hardware, a potential data transfer of the plurality of potential data transfers without an associated actual data transfer by determining that the access logs do not identify an actual data transfer between the entity computing system and the particular third-party computing system defined by the first access permission type and facilitating modification, by the computing hardware, of the first access credential to rescind the first access permission type.

A method, in accordance with some aspects, comprises: (1) scanning, by computing hardware, an entity computing system to identify access credentials, each of the access credentials providing access to the entity computing system by a first third-party computing system according to a set of permissions defined by each of the access credentials; (2) analyzing, by the computing hardware, each of the access credentials to determine the set of permissions; (3) processing, by the computing hardware, the set of permissions using a classification engine to assign a permission type to each permission in the set of permissions; (4) generating, by the computing hardware, a mapping of potential data transfers between the entity computing system and the third-party computing system based on the permission type for each permission in the set of permissions; (5) accessing and analyzing, by the computing hardware, access logs for the entity computing system to determine access activity by the third-party computing system under the access credentials; and (6) facilitating execution, by the computing hardware, of a responsive action based on the access activity. In some aspects, the method further includes determining, by the computing hardware, based on the access activity, that the third-party computing system has not utilized a first potential data transfer of the potential data transfers, and facilitating execution of the responsive action by causing the entity computing system to rescind an access credential associated with the first potential data transfer. In some aspects, the access activity indicates at least one of an amount of data accessed on the entity computing system by the third-party computing system under the access credentials, a frequency of data access on the entity computing system by the third-party computing system under the access credentials, and whether the third-party computing system utilized each permission in the set of permissions. In other aspects, responsive action comprise modifying the mapping of potential data transfers to include a plurality of actual data transfers based on the access activity. In some aspects, modifying the mapping of potential data transfers based on the access activity comprises modifying metadata associated with the mapping of potential data transfers to indicate, based on the access activity, which of the potential data transfers is associated with an actual data transfer between the entity computing system and the third-party computing system. In a particular aspect, the responsive action comprises at least one of transmitting a request to the third-party computing system to renew one of the access credentials, rescinding at least one of the access credentials, or modifying at least one permission in the set of permissions.

A system, in accordance with various aspects comprises a first computing system having one or more processing devices configured for: (1) querying an entity computing system to identify access credentials associated with third-party computing systems; (2) analyzing each of the access credentials to identify a respective access permission provided by each of the access credentials; (3) classifying each respective access permission by type; (4) generating a plurality of potential data transfers between the entity computing system and each of the third-party computing systems based on each respective access permission type; (5) inspecting access logs to identify which of the plurality of potential data transfers have an associated actual data transfer; and (6) identifying a potential data transfer of the plurality of potential data transfers without an associated actual data transfer. In some aspects, the system further comprises a second computing system communicatively coupled to the first computing system and having one or more additional processing devices configured for: (1) accessing, from the first computing system, a data map identifying the potential data transfer without the associated actual data transfer; (2) determining, a particular access credential of the access credentials that is associated with the potential data transfer without the associated actual data transfer; and (3) in response to determining the particular access credential, modifying the particular access credential.

In some aspects, the particular access credential includes a first access permission type and a second access permission type between the entity computing system and a particular third-party computing system, the plurality of potential data transfers include a first potential data transfer between the entity computing system and the particular third-party computing system defined by the first access permission type and a second potential data transfer between the entity computing system and the particular third-party computing system defined by the second access permission type, identifying the potential data transfer of the plurality of potential data transfers without an associated actual data transfer comprises determining that the access logs do not identify an actual data transfer between the entity computing system and the particular third-party computing system defined by the second access permission type, and modifying the particular access credential comprises modifying the particular access credential to rescind the second access permission type.

In particular aspects, each respective access permission provided by each of the access credentials defines a particular data object on the entity computing system associated with the respective access permission. In some aspects, modifying the particular access credential comprises modifying the respective access permission associated with the particular access credential to modify the type of the respective access permission associated with the particular access credential with respect to the particular data object. In a particular aspect one or more processing devices are further configured for inspecting the access logs to identify particular data objects accessed on the entity computing system by each of the third-party computing systems, and the plurality of potential data transfers between the entity computing system and each of the third-party computing systems defines a potential data transfer between each of the particular data objects and each of the third-party computing systems. In some aspects, classifying each respective access permission by type comprises assigning a classification to each respective access permission that includes at least one of read, write, or execute.

BRIEF DESCRIPTION OF THE DRAWINGS

In the course of this description, reference will be made to the accompanying drawings, which are not necessarily drawn to scale, and wherein:

FIG. 3 depicts an example of a graphical user interface that may be used with various aspects of the present disclosure;

FIG. 4 depicts another example of a graphical user interface that may be used in accordance with various aspects of the present disclosure;

FIG. 5 depicts another example of a graphical user interface that may be used in accordance with various aspects of the present disclosure;

FIG. 8 depicts another example of a graphical user interface that may be used in accordance with various aspects of the present disclosure;

DETAILED DESCRIPTION

Overview

Figure 1:
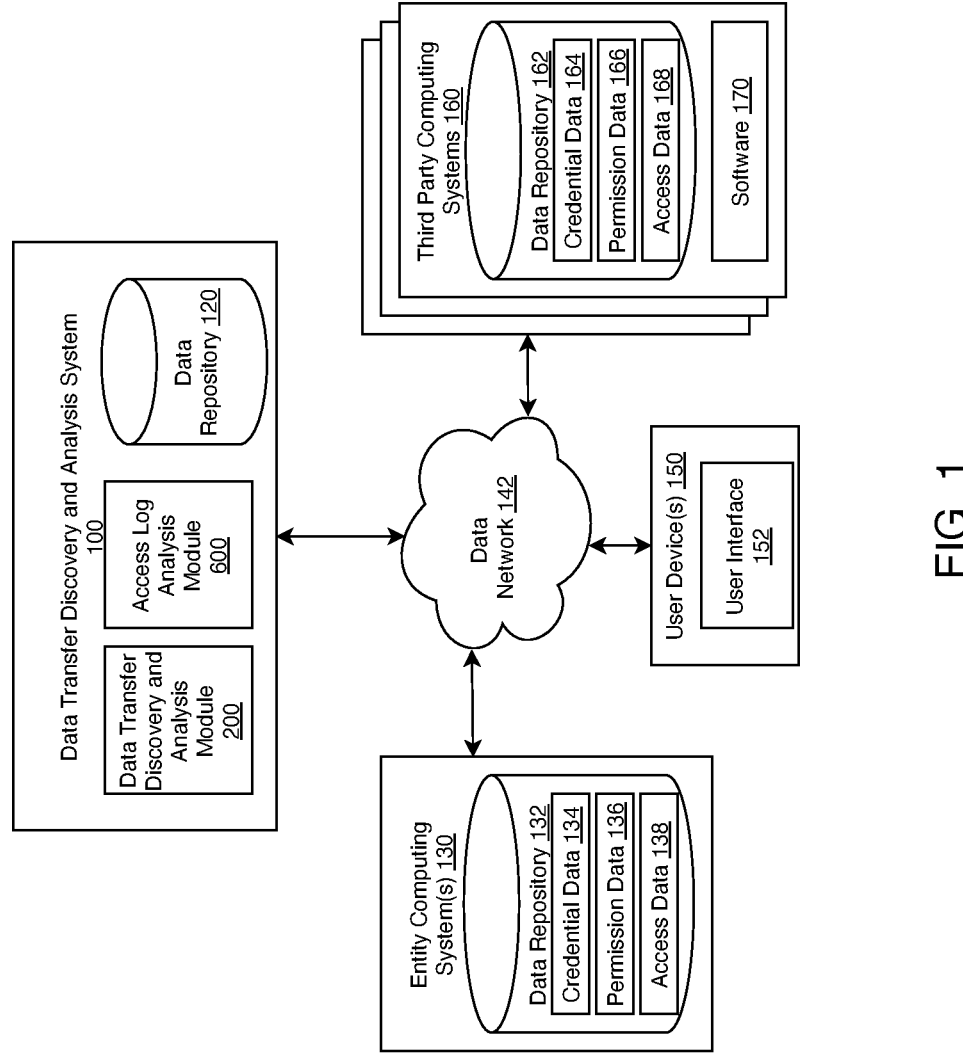
FIG. 1 depicts an example of a computing environment that can be used for discovering and analyzing potential and actual data transfers in accordance with various aspects of the present disclosure.

As noted above, a significant challenge encountered by many entities is the risk associated with accessing third-party computing systems with an entity computing system and/or providing access to the entity computing system by third-party computing systems. For example, many entity computing systems utilize computing functionality provided by a third-party computing system, such as data storage at the third-party computing system or software functions available from the third-party computing system. In order to protect particular data (e.g., sensitive data), computing systems may implement access control mechanisms in order to control access to databases, file repositories, software applications, and other computing functionality provided by the computing systems.

For example, a software application provided by a third-party computing system for performing particular computing functionality on an entity computing system may require access to data on the entity computing system in order to perform the particular computing functionality on the data. Payroll processing software (which may be provided by a third-party computing system), may, for example, need to access a database of employee information that includes employee names, banking, and other data in order to initiate payroll processing with a banking computing system. As such, an entity computing system that is utilizing the payroll processing software may provide access credentials to the payroll processing software (e.g., to the third-party computing system providing the payroll processing software) that provides permission for the payroll processing system to access (e.g., and read) the database of employee information.

Because the third-party computing system has permission to access certain data on the entity computing system (e.g., or another third-party computing system) via a set of access credentials, the risk to the entity computing system of a potential data loss incident is increased because the data that is subject to the access permissions may now be compromised via both a data loss incident at the entity computing system and the third-party computing system. As the number of third-party computing systems that have particular access permissions associated with the entity computing system increase (e.g., to provide even more computing functionality at the entity computing system), the risk posed by a potential data loss incident (e.g., such as a data breach) to all of the data that is accessible via certain access credentials similarly increases (e.g., because such data may now be exposed by a data loss incident at any of the third-party computing systems as well as the entity computing system).

Additionally, certain access permissions that are not actually utilized by a third-party computing system may unnecessarily expose data that is subject to the certain access permissions to data loss incident risk. An unutilized access permission could permit the establishment or use of a data transfer channel that may not actually be necessary to facilitate computing functionality provided by the third-party computing system. For example, a third-party computing system that has read, write, and execute access at an entity computing system may only actually require read access in order to implement desired third-party computing functionality provided by the third-party computing system at the entity computing system. As such, the third-party computing system may not utilize access permissions related to writing and executing data at the entity computing system. By continuing to allow write and execute permissions to the third-party computing system, the entity computing system may be unnecessarily exposed to certain data loss incidents, such as a malicious actor gaining access to the third party system, and using the write and execute permissions with the entity computing system to inject and execute malicious computer code at the entity computing system.

Accordingly, various aspects of the present disclosure overcome many of the technical challenges mentioned above associated with facilitating network communications between two different computing systems (e.g., an entity computing system and a third-party computing system, between third-party computing systems, etc.) through the identification and management of access credentials and their associated permissions. For example, a data transfer discovery and analysis system may query an entity computing system to identify access credentials for third-party computing systems and scan each access credential to determine associated permissions provided by each access credential. The data transfer discovery and analysis system may then classify each particular permission by permission type. This classification can include identifying a permission type provided by each credential with respect to particular data objects on the entity computing system (e.g., or third-party computing system). Examples of a data object include a particular application, a particular data type, a particular database or other data structure, a particular database entry or set of entries, etc. The data transfer discovery and analysis system may further inspect access logs to identify actual data transfers between the entity computing system and third-party computing systems as well as other access activity associated with each of the credentials.

In this way, the data transfer discovery and analysis system can generate and store a mapping of all actual data transfers (e.g., based on access log data) and potential data transfers (e.g., based on particular access permissions) between/among the entity computing system and the third-party computing systems. Additionally, by analyzing access logs to determine actual data transfers executed under each particular access credential, the data transfer discovery and analysis system can identify unused and/or underutilized access permissions. The data transfer discovery and analysis system can then modify the unused and/or underutilized access permissions to reduce and/or eliminate data loss risks associated with providing unnecessary access permissions at an entity computing system.

In the course of this description, reference is made to access credentials. Access credentials may include any credential used to authenticate an accessor (e.g., a computing system or user of a computing system) for accessing a particular computing system (e.g., entity computing system) based on access permissions defined by the access credential. For example, an access credential may include a username and password, an authentication token, an authentication service (e.g., single sign-on), an application programming interface (API) key, a service account, an authorization protocol such as OAuth2.0 (e.g., using client credentials, a bearer token, etc.) and/or the like.

Example Computing Environment

FIG. 1 depicts an example of a computing environment that can be used for discovering and analyzing potential and actual system-to-system data transfers. For instance, a data transfer discovery and analysis system 100 can scan an entity computing system 130 to discover access credentials used for communication between the entity computing system 130 and one or more third-party computing systems 160. Examples of access credentials can include service accounts, registered applications, application programming interface (API) keys, stored credentials, etc. The data transfer discovery and analysis system 100 can classify permissions provided by each of the access credentials to third-party computing systems 160.

The computing environment depicted in FIG. 1 includes various hardware components. For instance, the data transfer discovery and analysis system 100 is a specialized computing system that can be used to identify potential data transfers and actual data transfers. Potential data transfers can identify data transfers between an entity computing system 130 and a third-party computing system 160 that are allowed under permissions granted via one or more access credentials. Actual data transfers include records of historical data transfers to and from the entity computing system 130 that are ascertained from access logs or other access data 138. The data transfer discovery and analysis system 100 can communicate with various computing systems, such as an entity computing system 130 or a third-party computing system 160, over a data network 142, such as the Internet. In various aspects, the entity computing system 130 may include any computing system that is operated by a particular entity (e.g., an organization) that may desire to determine data transfers (e.g., both actual and potential data transfers) into and out of the entity computing system 130 (e.g., to and/or from third-party computing systems 160). In some aspects, the entity computing system 130 may include the data transfer discovery and analysis system 100. In additional or alternative aspects, the entity computing system 130 may be a computing system independent of the data transfer discovery and analysis system 100. For instance, the data transfer discovery and analysis system 100 could be a computing system implementing a multi-tenant architecture in which each entity computing system 130 has a respective tenant (e.g., one or more user accounts sharing common privileges with respect to an application instance) for accessing one or more of the data transfer discovery and analysis module 200, the access log analysis module 700, and/or the data repository 120. In additional or alternative aspects, the data transfer discovery and analysis system 100 may be independent of an entity computing system 130 (e.g., as described above with respect to the multi-tenant SaaS environment), and may deploy software program at the entity computing system 130 in order to perform one or more functions described with respect to the data transfer discovery and analysis system 100 (e.g., one or more operations described with respect to the data transfer discovery and analysis module 200 and/or the access log analysis module

700). For instance, a software program such as a worker node installed on a given entity computing system 130 could perform certain functions of the data transfer discovery and analysis module 200 and/or the access log analysis module 700 and could connect to a tenant of that entity computing system 130 in the data transfer discovery and analysis system 100 for performance of other functions of the data transfer discovery and analysis module 200 and/or the access log analysis module 700.

In some aspects, a potential data transfer may include a record or other data object that identifies a permissible transfer. For instance, the potential data transfer indicates that the entity computing system 130 has permission, by virtue of any suitable authentication or credentialing process (e.g., one or more access credentials) with one or more third-party computing systems 160, to transfer data to or receive transferred data from one or more third-party computing systems 160. In some aspects, potential data transfers may define a data transfer channel via which the entity computing system 130 and/or third-party computing systems 160 have permission to transfer data (e.g., to or from another computing system). The data transfer channel can be defined in the potential data transfer regardless of whether any access log includes data indicating that the entity computing system 130 and/or third-party computing systems 160 have actually utilized the data transfer channel.

In one example, if an entity computing system 130 has read/write access with a particular third-party computing system 160 provided via an API key, a potential data transfer channel can exist between the entity computing system 130 and the particular third-party computing system 160 (e.g., via a data network 142). In this example, because the entity computing system 130 has read/write access with the particular third-party computing system 140, the potential data transfer channel includes both a potential transfer of data from the entity computing system 130 to the particular third-party computing system 160 and from the particular third-party computing system 160 to the entity computing system. In various aspects, the potential data transfer exists between the entity computing system 130 and the particular third-party computing system 160 regardless of whether the entity computing system 130 has written data to the particular third-party computing system 160, has read data from the third-party computing system 160, or has done neither.

In various aspects, the data transfer discovery and analysis system 100 includes a specialized computing system that can be used for querying entity computing systems 130 to identify access credentials for third-party computing systems 160. In still other aspects, the data transfer discovery and analysis system 100 can query third-party computing systems 160 to identify access credentials for an entity computing system 130 and/or other third-party computing systems 160.

In some aspects, the data transfer discovery and analysis system 100 can access credential data 134, permission data 136, and/or access data 138 on the entity computing system 130 (e.g., in one or more data repositories 132 on the entity computing system 130). The data transfer discovery and analysis system 100 can then use the credential data 134, permission data 136, and/or access data 138 to identify potential data transfers and actual data transfers between the entity computing system 130 and third-party computing systems 160. The data transfer discovery and analysis system 100 can then generate a mapping of the potential data transfers and the actual data transfers to determine a flow of data (e.g., and a potential flow of data) into and out of the entity computing system 130.

The data transfer discovery and analysis system 100 can include computing hardware performing a number of different processes for identifying and analyzing access credentials (e.g., stored as credential data 134, 164), access permissions provided by the access credentials (e.g., stored as permission data 136, 166 and/or determined using a classification engine), and access activity (e.g., stored as access data 138, 168) in order to identify potential data transfers and actual data transfers between an entity computing system 130 and third-party computing systems 160. The data transfer discovery and analysis system 100 can then execute one or more actions related to the identified potential data transfers and actual data transfers.

In various aspects, the access credentials may include any authorization necessary to provide access (e.g., limited access) to the entity computing system 130 by the third-party computing systems 160. In some aspects, the access permissions may include read, write, and/or execute permissions. In other aspects, the access permissions may include more granular permissions. The more granular permissions may, for example, define a permission type for each of a plurality of data objects, data repositories, software applications, etc. on the entity computing system 130. Examples of access credentials used to authenticate an accessor include a username and password, an authentication token, an authentication service (e.g., single sign-on), an application programming interface (API) key, a service account, an authorization protocol such as OAuth2.0 (e.g., using client credentials, a bearer token, etc.) and/or the like.

The entity computing system 130 (e.g., and/or the third-party computing systems 160) may implement, via these access credentials, access controls to protect sensitive data and other data. The entity computing system 130 (e.g., and/or the third-party computing systems 160) may implement these access controls to limit access to certain databases, file repositories, software applications, and/or the like. For example, before accessing an entity computing system 130, an accessor (e.g., a third-party computing system 160 or a user thereof) must first authenticate itself to the entity computing system 130. Once the entity computing system 130 has authenticated the accessor, the entity computing system 130 can check the permissions associated with the access credentials used to authenticate the accessor, and provide the proper level of data access.

In some aspects, different third-party computing systems 160 may have a different access credentials. In additional or alternative aspects, different device types may access the entity computing system 130 using different access credentials. For example, a user device 150 could access an entity system 130 or third-party computing system 160 using user-specific credentials (e.g., a username and password), whereas a third-party computing system 130 may use system-to-system communication access credentials to access an entity system 130.

In the example depicted in FIG. 1, the data transfer discovery and analysis system 100 includes a data transfer discovery and analysis module 200, and an access log analysis module 700. The data transfer discovery and analysis system 200 includes program code to identify access credentials for an entity computing system, determine and classify permissions associated with those access credentials, and generate and/or modify a mapping of potential data transfers and actual data transfers (e.g., representing a utilization of the potential data transfers) between the entity computing system 140 and the third-party computing systems 160. The access log analysis module 700 includes program code to determine access activity for each of the access credentials (e.g., utilization, frequency of utilization, volume of data accessed during utilization, etc.).

The data transfer discovery and analysis system 100 can also communicate with third-party computing systems 160 over a data network, such as the internet 142. The third-party computing systems 160 can include a data repository 162 that stores access credential data 164, permission data 166, and/or access data 168 on the third-party computing systems 160. In some aspects, the data transfer discovery and analysis system 100 can access and use the credential data 164, permission data 166, and/or access data 168 to identify the potential data transfers and actual data transfers between the entity computing system 130 and third-party computing systems 160, as well as between and/or among the third-party computing systems 160.

The third-party computing systems 160 can also communicate with the entity computing system 130 over a data network 142. The third-party computing systems 160 can include one or more software applications 170 and a data repository 162. In various aspects, the third-party computing system may have available computing functionality (e.g., such as data storage on the data repository 162, software functionality provided by the software application(s) 170, processing capability, etc.). In various aspects, the third-party computing systems 160 can communicate with (e.g., transmit data to, receive data from, etc.) the entity computing system 130. In such aspects, the communication between the entity computing system 130 and/or the third-party computing systems 160 may be limited by one or more permissions described herein (e.g., defined by one or more access credentials for authenticating the network communication between the entity computing system 130 and/or the third-party computing systems 160). The third-party computing systems 160 can provide computing functionality to the entity computing system 130 (e.g., via the data network 142).

In some aspects, the computing environment may include a user device 150, which may, for example, communicate with the entity computing system 130 to provide access, by the user device 150, to the entity computing system 130 (e.g., via a user interface 152 on the user device 150). In various aspects, the communication between the entity computing system 130 and the user device may be limited by one or more access permissions defined by credentials provided by the entity computing system 130 to the user device 150. In some aspects, the entity computing system 130 may store credential data 134 and permission data 136 for the user device(s) 150. In various aspects, when discovering the access credentials for the entity computing system 130, the data transfer discovery and analysis system 100 may distinguish between access credentials for user device(s) 150 and the third-party computing systems 160 (e.g., because a third-party computing system 160 may access a larger volume of data at the entity computing system 130 than a user device 150, thereby posing a greater risk of a data loss event).

The number of devices depicted in FIG. 1 are provided for illustrative purposes. In some aspects, different number of devices may be used. In various aspects, while certain devices or systems are shown as single devices in FIG. 1, multiple devices may instead be used to implement these devices or systems.

In some aspects, the data transfer discovery and analysis system 100 can include one or more third-party devices such as, for example, one or more servers operating in a distributed manner. The data transfer discovery and analysis system 100 can include any computing device or group of computing devices, and/or one or more server devices Although the data repositories 120, 132, 140 are shown as separate components, these components 120 may include, in other aspects, a single server and/or repository, servers and/or repositories, one or more cloud-based servers and/or repositories, or any other suitable configuration.

Data Transfer Discovery and Analysis Module

Figure 2:
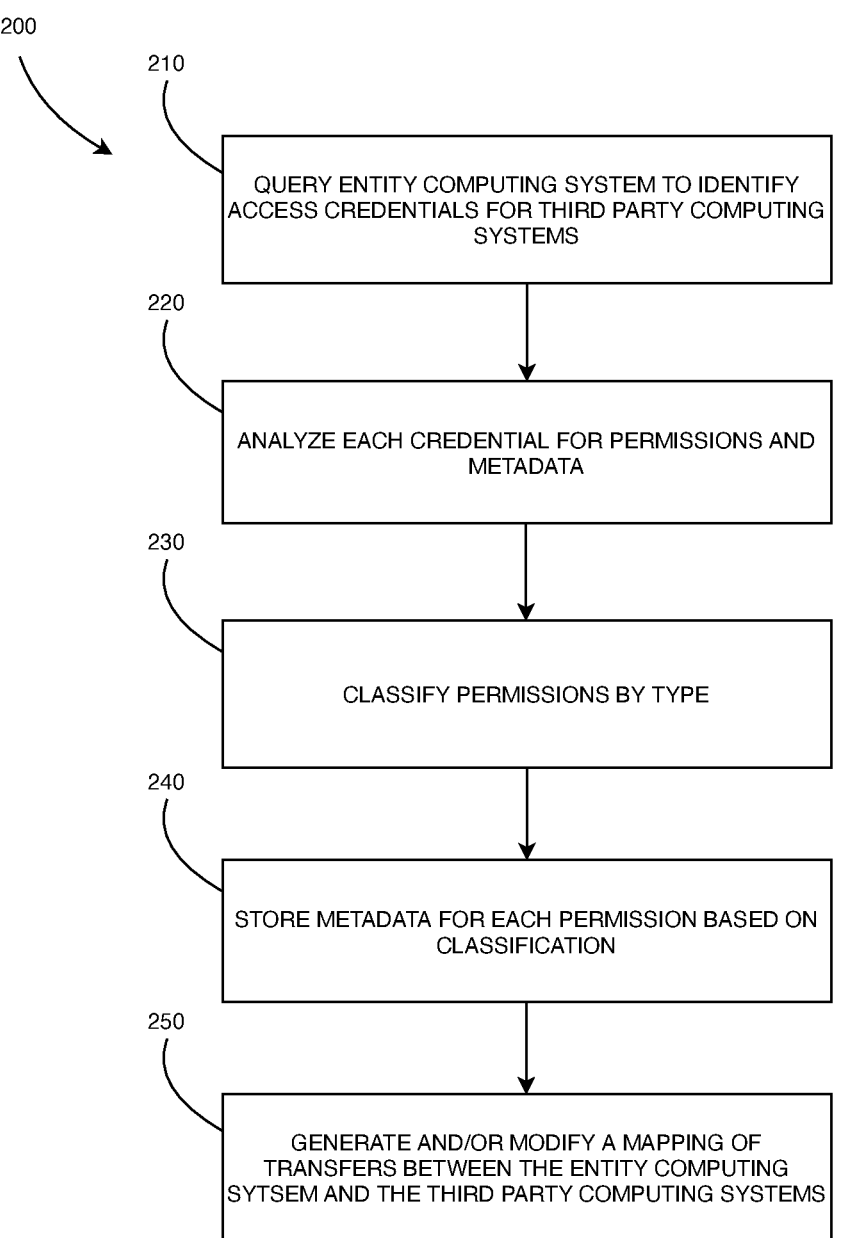
FIG. 2 depicts an example of a process for identifying access credentials for an entity computing system and determining permissions associated with those access credentials in accordance with various aspects of the present disclosure.

FIG. 2 depicts an example of a process performed by a data transfer discovery and analysis module 200. This process includes operations that the data transfer discovery and analysis system 100 can execute to identify access credentials for an entity computing system 130 and determine permissions associated with those access credentials in accordance with various aspects of the present disclosure. For instance, the flow diagram shown in FIG. 2 may correspond to operations performed, for example, by computing hardware found in data transfer discovery and analysis system 100 as the computing hardware executes the data transfer discovery and analysis module 200.

At operation 210, the data transfer discovery and analysis module 200 queries the entity computing system 130 to identify access credentials for third-party computing systems 160, respectively. For example, the data transfer discovery and analysis system 100 can query the entity computing system 130 to generate a list of access credentials associated with the entity computing system 130. This list could include access credentials necessary for the entity computing system 130 to access functionality provided by the third-party computing systems 160. In some aspects, the access credentials may be stored at the entity computing system 130 as credential data 134 (e.g., on a data repository 132). In some aspects, the data transfer discovery and analysis system 100 can query the entity computing system 130 by structuring queries according to an access credential storage configuration at the entity computing system 130. For example, the data transfer discovery and analysis system 100 can structure queries to cause the entity computing system 130 to retrieve the access credentials from defined storage locations at the entity computing system 130.

In some aspects, the data transfer discovery and analysis system 100 scans the entity computing system 130 to identify access credentials connected to the entity computing system 130. The data transfer discovery and analysis system 100 may, for example, scan the entity computing system 130 to identify service accounts (e.g., service accounts utilized by the entity computing system 130), registered applications (e.g., registered applications utilized by the entity computing system 130 that the entity computing system 130 has authenticated), API keys, etc.

Turning briefly to FIG. 3, FIG. 3 depicts an example of a graphical user interface 300 that the data transfer and analysis module 200 may generate to display discovered registered applications. In this example, the listing includes Azure registered applications on the entity computing system 130 and identifies, for each registered application, an application type 320 (e.g., web application, API, etc.), application ID 330, and display name 310. In various aspects, the registered applications may include a portion of the credentialed (e.g., authenticated) computing systems, software applications, etc. for the entity computing system 130.

In some aspects, the identified access credentials may include credentials for providing access between different third-party computing systems 160. For example, a first third-party computing system 160 may provide particular computing functionality (e.g., payroll software) that requires access to employee data (e.g., names, banking information, etc.). An entity computing system 130 may utilize a second third-party computing system 160 to store such information. As such, in various aspects, the identified access credentials may include one or more credentials provided by the entity computing system 130 to the first third-party computing system for accessing the second third-party computing system 160.

Returning to FIG. 2, at operation 220, the data transfer discovery and analysis module 200 can analyze each access credential to determine permissions for each credential, in addition to other metadata. In some aspects, analyzing each access credential to determine the permissions for each credential can include querying the entity computing system 130 for the permissions associated with each credential. For example, the data transfer discovery and analysis system 100 can query the entity computing system 130 for permissions associated with a particular role identified using the credential. A particular credential may, for example, define a user role for an individual that holds the credential, such as 'site administrator.' In this example, the data transfer discovery and analysis system 100 may query the entity computing system for all permissions associated with the 'site administrator' role identified by the credential.

In various aspects, the permissions may include a set of permissions defined by each access credential. Examples of the permissions include read, write, execute, and/or delete permissions. In some aspects, one or more of these permissions (e.g., read, write, execute, and/or delete permissions) can be limited to particular data objects on the entity computing system. The set of permissions includes each permission corresponding to a particular data object at the entity computing system 130. In such aspects, the set of permissions may define different permission levels (e.g., permission types) for different data objects, respectively, at the entity computing system 130.

In some aspects, the data transfer discovery and analysis system 100 may analyze the scope of the permissions granted by each access credential (e.g., to a third-party computing system 130) with respect to the entity computing system 130. The scope of the permissions may define, for example, particular data objects and/or data on the entity computing system 130 to which the access permissions apply, such as the data objects and/or data that the third-party computing system 160 may access on the entity computing system 130.

Turning briefly to FIG. 4, FIG. 4 depicts an example of a graphical user interface 400 that the data discovery and analysis module 200 may generate to display scanned metadata and permissions for particular credentials. In this example, the data discovery and analysis module 200 determines, for each permission, a permission name 410 (e.g., credentials), a permission type 420, as well as a description 430. The data discovery and analysis module 200 can, for example, determine access levels for each third-party computing system 160 with respect to the entity computing system 130 based on the permissions associated with the credentials for each third party system 160. In the example shown in FIG. 4, the data discovery and analysis module 200 has identified multiple permissions provided to Microsoft® Graph (e.g., provided by a particular third-party computing system 160), each of which the data transfer discovery and analysis module 200 identified based on one or more credentials for the third-party computing system 130 providing functionality associated with Microsoft® Graph.

In various aspects, the data transfer discovery and analysis module 200 may store the identified credentials, the associated permissions, and metadata in the data repository 120. The stored metadata can identify the scope of each access permission with respect to the entity computing system 130.

Turning to operation 230, the data transfer discovery and analysis module 200 can classify access permissions by type. The data transfer discovery and analysis module 200 may classify the permission by processing the permission name to identify one or more of the type of data object that is subject to the permission (e.g., applications), the type of permission granted (e.g., read and write), and/or the extent of the permission (e.g., all applications).

For example, a particular permission (e.g., application-.readwrite.all) may provide a particular third-party computing system 160 permission to read and write all applications on the entity computing system 130. A 'read' permission granted to a particular third-party computing system 160 by the entity computing system 130 via an associated credential can enable the particular third-party computing system 160 to transfer data from the entity computing system 130 to the particular third-party computing system 160. A 'write' permission granted to a particular third-party computing system 160 by the entity computing system 130 via an associated credential can enable the particular third-party computing system 160 to transfer data from the particular third-party computing system 160 to the entity computing system 130.

In some aspects, the data transfer discovery and analysis module 200 can use a natural language processing tool that can parse a permission name for a particular permission in order to classify the permission. For example, a permission name may include a particular naming structure that the data transfer discovery and analysis module 200 can parse to classify the type of permission from the permission name. In one example, permission names may have a structure according to the pattern: 'resource.operation.constraint'. In some aspects, the 'resource' component of the permission name can define the resource to which the permission applies. For example, a permission name of (ser. Read can grant permission to read the profile of a signed-in user. In another example, a permission name of Mail.Read can grant permission to send mail on behalf of the signed-in user.

In some aspects, the 'operation' component of the permission name can define the type of permission granted by the permission. As described herein, the type of permission can include read, write, read/write, etc. In various aspects, the constraint element of the permission name may define the extent of access of a particular application, user, and/or system according to the particular permission. For example, a 'constraint' element of 'All' (e.g., User.Read.All) can grant permission for an application or system to perform operations on all of the resources of the resources of a specified type. In the example of a permission name of User.Read.All, the permission may grant an application privileges to read the profiles of all of the users in a particular directory. In other aspects, the 'constraint' element may define a particular folder, or any other limited set of resources.

In some aspects, the data transfer discovery and analysis module 200 uses a classification engine to classify each of the permissions by type. For example, the classification engine may classify each permission based on a permission name, type, and/or description. To do so, the classification engine uses a machine-learning model that generates classifications (e.g., predictions) of permission types for permissions identified with respect to Operation 220 discussed above.

In various aspects, the classification engine may initially assign one or more permission types for various categories to particular permission names and/or descriptions.

In some aspects, the classification engine may be configured to pre-process a set of permission data for each permission identified for each access credential to place the data in a more favorable format for classification analysis. For instance, the set of permission data (e.g., name, description, etc.) may include text data such as a permission name, narrative text available that provides a written description of the permission, or other data regarding the permission. FIG. 5 depicts an example of a graphical user interface 500 that includes information regarding a particular permission (e.g., user.read). In some aspects, the data transfer discovery and analysis module 200 can input such information into the classification engine for use in classifying the permission. Here, the classification engine may be configured to pre-process the text data (e.g., such as the text data from a description of the permission as shown in FIG. 5) for each identified permission to generate one or more embedded representations of the text data. For example, according to some aspects, the classification engine may perform some type of natural language processing, such as word embedding, on the text data to generate the one or more embedded representations of the text data. An embedded representation may comprise a vector representation of the text data having components with numerical values representing characteristics, attributes, and/or the like of the text data.

The classification engine can identify, using the pre-processed of sets of permission data for the identified permissions, one or more permission types that are applicable to each identified permission. According to various aspects, the classification engine uses a classification model to identify one or more permission types related to each identified permission by processing the identified permission (e.g., a name and/or description thereof). The classification model can include a machine-learning model, such as a multi-label classification model that generates an output for an identified permission identifying each potential permission type that may be associated with (i.e., relevant to) the identified permission. For example, the multi-label classification model may be a supervised, unsupervised, or semi-supervised trained machine-learning model such as a logistic regression model, clustering model, decision tree model, neural network, and/or the like.

In some aspects, the classification model may comprise an ensemble of multiple classifiers. For instance, each classifier in the ensemble, when applied by the classification engine to a permission identified for an entity computing system 130, could compute a probability or confidence that the permission has a certain permission type. The output of the ensemble of classifiers can be a vector representation $y=[y_1, y_2, \ldots y_n]$. In this example, each component $y_i$ of the vector $y$ corresponds to respective permission type $i$ associated with the identified permission. The classifier for permission type $i$ computes the value of component $y_i$. The value of component $y_i$ identifies or otherwise assigns a confidence or probability of the permission type $i$ being applicable to the data object. If the data transfer discovery and analysis module 200 determines that the confidence or probability for a given permission type $i$ exceeds a threshold (e.g., $y$; $\geq 0.75$), then the data transfer discovery and analysis module 200 assigns the permission type $i$ to the data object.

At operation 240, the data transfer discovery and analysis module 200 stores metadata for each identified permission based on the classification. For example, the data transfer discovery and analysis module 200 can store a record of each identified permission along with an indication of the type of permission identified by the classification (e.g., in a database or other data structure). In some aspects, the data transfer discovery and analysis module 200 can store a respective table of each identified permission according to the classification type. For example, the data transfer discovery and analysis module 200 can store a first table of permissions that have been classified as type "read", a second table of permissions that have been classified as type "write", etc.

At operation 250, the data transfer discovery and analysis module 200 generates and/or modifies a mapping of transfers between the entity computing system 130 and the third-party computing systems 160. In one example, the data transfer discovery and analysis system 100 and/or the entity computing system 130 generates a mapping by using the transfer data to construct a data model for the entity computing system 130. In another example, the data transfer discovery and analysis module 200 may modify an existing mapping of transfers between the entity computing system 130 and the third-party computing systems 160 to update a data model to include newly identified transfers resulting from newly identified access credentials, modified access permissions, etc. For instance, the data transfer discovery and analysis module 200 may modify an existing data model (e.g., data graph) to define new transfer relationships between the entity computing system 130 and third-party computing systems using the access credential data and permission data described herein.

In these examples, a data model may define (identify) the various third-party computing systems 160 that have a potential or actual data transfer with the entity computing system 130. In addition, the data model may map relationships between and/or among the entity computing system 130 and the third-party computing systems 160. Further, the data model may define various attributes for each of the potential and/or actual data transfers. Examples of such attributes include: (1) a type of data subject to the potential and/or actual data transfer; (2) identification of a permission type associated with the potential and/or actual data transfer; (3) an identification of one or more data objects at the entity computing system 130 and/or third-party computing systems 160 that are subject to the potential and/or actual data transfer; and (4) a utilization data for each of the potential data transfers (e.g., whether a corresponding actual data transfer has been performed via a potential data transfer channel defined by one or more access permissions, an extent and/or frequency of such utilization, etc.).

In some aspects, the data transfer discovery and analysis module 200 may generate a data model by generating the mapping of transfers (e.g., data map) between the entity computing system 130 and the third-party computing systems 160. The data transfer discovery and analysis module 200 may generate the mapping of transfers between the entity computing system 130 and the third-party computing systems 160 based on one or more valid credentials held by each respective third-party computing system 160 with regard to accessing, writing, deleting data on the entity computing system 130. For example, the data transfer discovery and analysis module 200 may generate a mapping reflecting that a first system (e.g., the entity computing system 130) has read/write access to a second system (e.g., a particular third-party computing system 160), while the second system has read access to the first system. The data transfer discovery and analysis module 200 may determine access levels for each system with respect to another system based on one or more permissions associated with each system's credentials for at least one other system (e.g., data source). In this way, the data transfer discovery and analysis module 200 may generate and store a mapping of all actual data transfers (e.g., based on one or more access logs) and potential data transfers (e.g., based on one or more permissions) between/among one or more computing systems.

Figure 6:
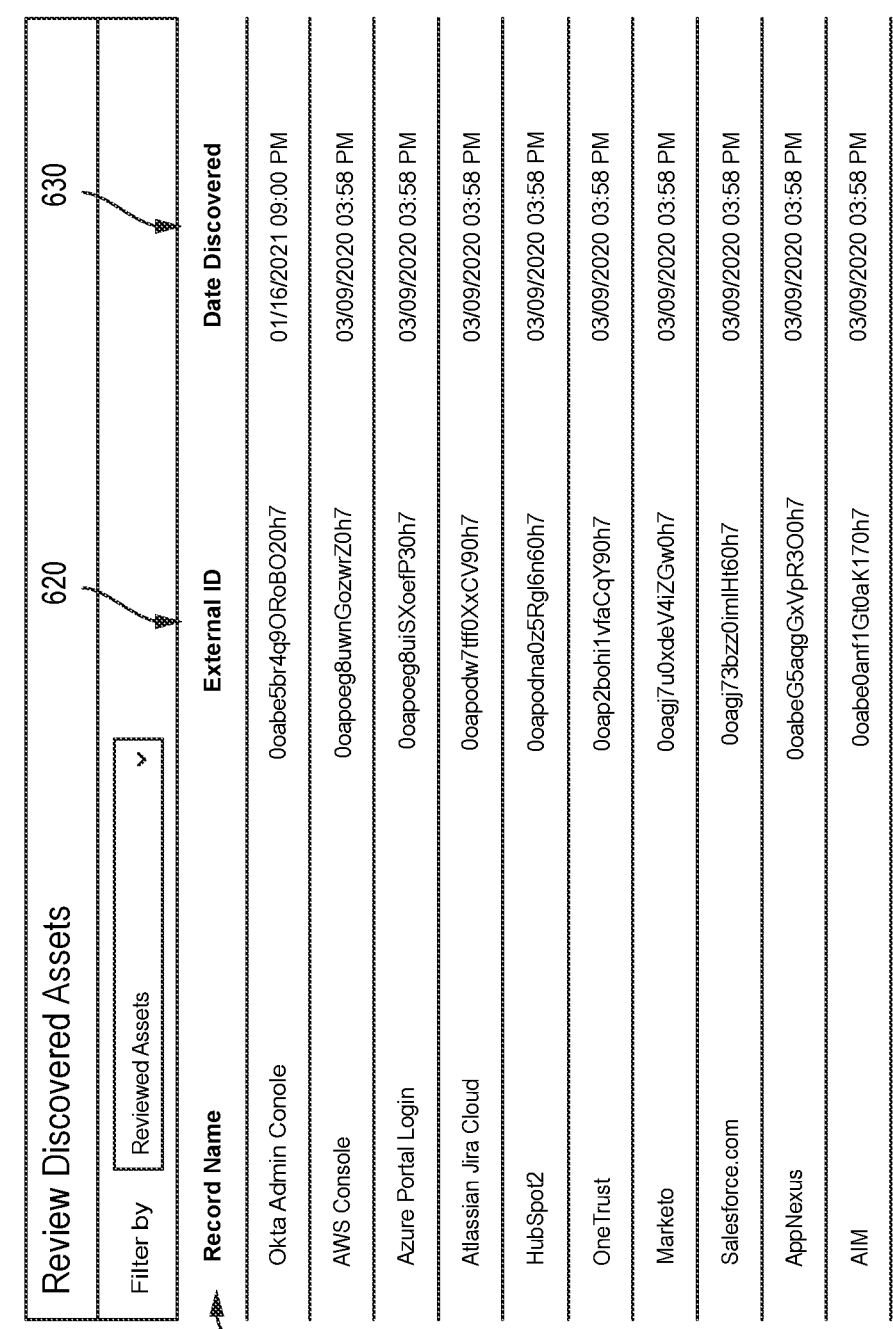
FIG. 6 depicts another example of a graphical user interface that may be used in accordance with various aspects of the present disclosure.

In some aspects, the data transfer discovery and analysis module 200 may generate a user interface and present such a user interface on a computing device to enable a user to select particular discovered accessors (e.g., record names) for incorporating into a mapping described herein. FIG. 6 depicts an example of a graphical user interface 600 that the data transfer discovery and analysis module 200 may generate and display. In this example, the graphical user interface 600 includes information regarding discovered accessors 610, metadata that identifies an external ID 620 for each of the discovered accessors and timing data 630 identifying when the accessors were discovered.

For illustrative purposes, the data discovery and analysis module 200 is described with reference to implementations described above with respect to one or more examples described herein. Other implementations, however, are possible. In some aspects, the steps in FIG. 2 may be implemented in program code that is executed by one or more computing devices such as the data transfer discovery and analysis system 100, the entity computing system 130, or other system in FIG. 1. In some aspects, one or more operations shown in FIG. 2 may be omitted or performed in a different order. Similarly, additional operations not shown in FIG. 2 may be performed.

Access Log Analysis Module

Figure 7:
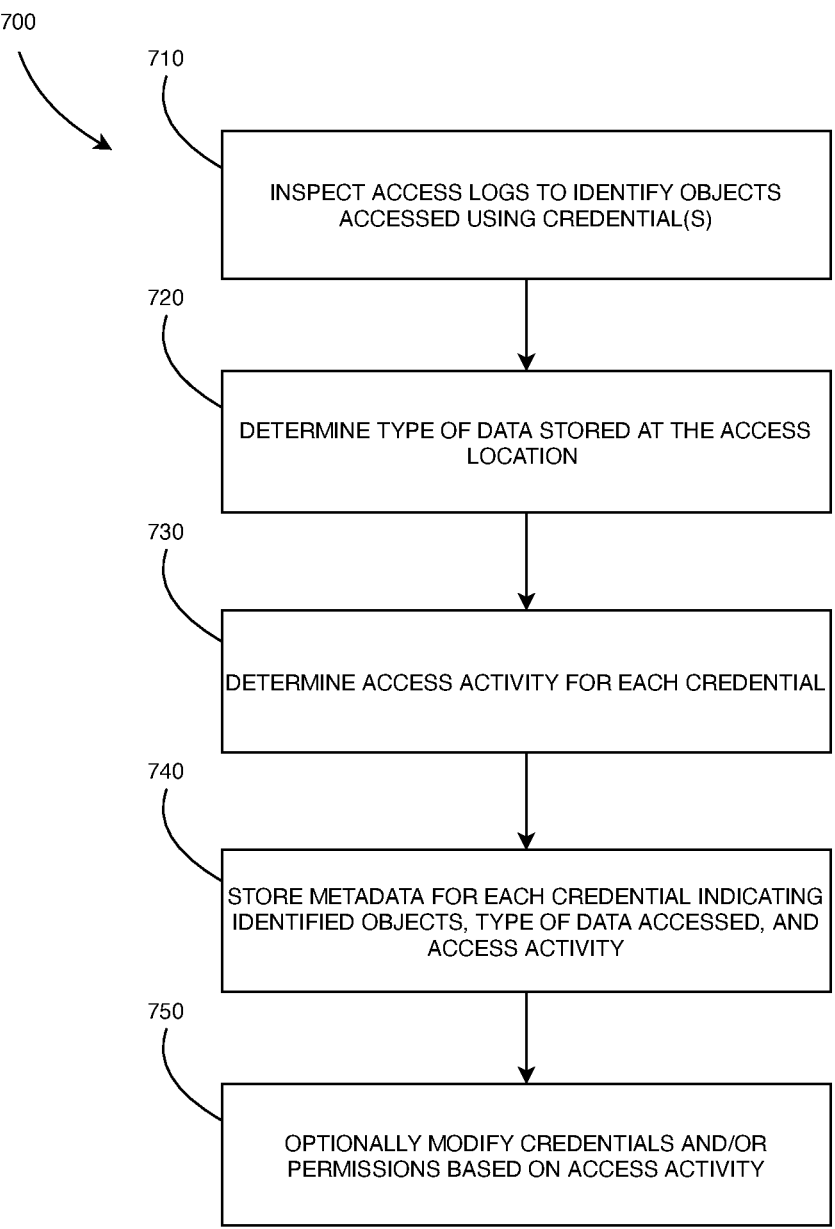
FIG. 7 depicts an example of a process for inspecting access logs to determine access activity for each identified access credential in accordance with various aspects of the present disclosure.

FIG. 7 depicts an example of process performed by an access log analysis module 700. This process includes operations that the data transfer discovery and analysis system 100 may execute to determine access activity for each of the access credentials (e.g., utilization, frequency of utilization, volume of data accessed during utilization, etc.). For instance, the flow diagram shown in FIG. 7 may correspond to operations performed, for example, by computing hardware found in data transfer discovery and analysis system 100 as the computing hardware executes the access log analysis module 700.

At operation 710, the access log analysis module 700 inspects access logs to identify one or more access locations (e.g., data objects) that have been accessed using particular credentials. For example, the access log analysis module 700 may identify each data object accessed (e.g., read, written, etc.) by a third-party computing system 160 during a session between the third-party computing system 160 and the entity computing system 130, where the session was established using a particular set of credentials. The access log analysis module 700 can thereby generate or obtain actual data transfer data (e.g., indications of data being read or written via communications between the third-party computing system 160 and the entity computing system 130) for each potential data transfer channel defined by the access permissions described herein. FIG. 8 depicts an example of a graphical user interface 800 that the access log analysis module 700 may generate and display that includes an example of an access log for a particular object. In this example, the access log includes a log of usernames 810, a source 820 of each access (e.g., IP address), a user agent 830 (e.g., browser data from which the entity computing system was accessed by the source 920), and a timestamp 840 (e.g., indicating a time of the access). In this example, IP addresses are included for illustrative purposes and may not include valid IP addresses. In some aspects, IP addresses in a range 0-255 may be used in practice. In some aspects, the data transfer discovery and analysis system 100 can inspect access logs for various data objects to identify particular credentials that have accessed each data aspects. In other aspects, an access log may indicate, for a particular credential, an actual data object accessed (e.g., a particular field in a database, a particular database, a particular type of data accessed, whether the access included a read, write, or other action, etc.).

At operation 720, the access log analysis module 700 may determine a type of data stored at the access location (e.g., at the data object) identified in operation 410. In such aspects, the access log analysis module 700 may determine a type of data stored at the data object based on an attribute of the data object. The type of data may include, for example, a data category (e.g., name, birthdate, etc.). The access log analysis module 700 can access the data object and analyze object attributes for the data object to identify a type of data stored at the data object.

At operation 730, the access log analysis module 400 may determine access activity for each access credential. In some aspects, the access activity may include utilization data for each of the potential data transfers (e.g., whether a corresponding actual data transfer has been performed via a potential data transfer channel defined by one or more access permissions, an extent and/or frequency of such utilization, a volume of data accessed, a type of data accessed, etc.). In one example, the access log analysis module 700 may determine, for each access credential, time and/or frequency of a particular credential's (e.g., a particular API key) use to access the entity computing system 130. The access log analysis module 700 may further analyze the one or more access logs to determine one or more details about how one or more permissions from a particular access credentials have been used. For instance, the access log analysis module 700 could determine an amount of data accessed under one or more of the permissions, an activity level of access under one or more of the permissions, whether one or more of the permissions are utilized at all or are inactive, etc.

In some aspects, determining the access activity may include determining whether a particular credential was used to perform at least one access action that includes each particular permission provided by the credential. For example, a particular access credential may include a first access permission type and a second access permission type. In such aspects, each of the first and second access permission types may define potential data transfers between the entity computing system 130 and the third-party computing systems 160. The access log analysis module 700 can also determine whether the access activity includes actual data transfers defined by the first or second access permission type. The access log analysis module 700 can compare the potential data transfers to the actual data transfers and thereby determine whether any permissions were unused (e.g., a potential data transfer without a corresponding actual data transfer) and/or the utilization of the permission (e.g., the number of actual data transfers corresponding to a particular potential data transfer). In this way, the access log analysis module 700 may distinguish between utilized and unutilized permissions at the permission type level (e.g., even when those permission types are both provided by a single set of credentials).

At operation 740, the access log analysis module 700 may store metadata for each credential indicating identified data objects accessed, the type of data accessed, and the access activity data.

At operation 750, the access log analysis module 700 may optionally modify credentials and/or permissions based on access activity for a particular set of credentials. In one example, the access log analysis module 700 may rescind a particular set of credentials (e.g., render the set of credentials inoperable) in response to determining that the particular set of credentials has not utilized a particular permission type granted by the set of credentials. In another example, the access log analysis module 700 may modify permissions for a particular set of credentials to remove a permission that has been underutilized (e.g., that has not been utilized, has been utilized fewer than a threshold of times, has been utilized to transfer less than a threshold amount of data, etc.). In another example, the access log analysis module 700 may modify permissions for a particular set of credentials to remove a permission that has been overutilized (e.g., has been utilized more than a threshold of times, has been utilized to transfer less than a threshold amount of data, etc.).

In various aspects, the data transfer discovery and analysis system 100 can facilitate modification of the credentials and/or permissions. In some aspects, the data transfer discovery and analysis system 100 can send a command to an entity computing system 130 (e.g., via an API call or other system integration) to cause the entity computing system 130 to modify certain permissions. In other aspects, the data transfer discovery and analysis system can generate provide the entity computing system 130 with data related to each credential and its associated permissions, including actual transfers utilized under each permission, etc. The entity computing system 130 can then use the information to implement modifications to the credentials and/or permissions using other computing software.

In some aspects, the access log analysis module 700 may suggest one or more modifications to permissions and elicit user input to confirm or reject the suggested modifications. For example, based on how a particular credential is using its one or more permissions (e.g., an amount of data accessed, an activity level of access, whether the one or more permissions are utilized at all or are inactive, etc.) the access log analysis module 700 may prompt a particular accessor to renew one or more credentials, rescind one or more credentials, modify one or more permissions associated with one or more credentials, generate one or more reports (e.g., regulation compliance reports, breach reports, etc.), etc. In some aspects, the access log analysis module 700 can suggest the modifications (e.g., prompt the entity computing system 130 to make the modifications) in response to determining that a particular data transfer channel has an activity and/or data access level that is below a particular threshold, above a particular threshold, etc.

For illustrative purposes, the access log analysis module 700 is described with reference to implementations described above with respect to one or more examples described herein. Other implementations, however, are possible. In some aspects, the steps in FIG. 7 may be implemented in program code that is executed by one or more computing devices such as the data transfer discovery and analysis system 100, the entity computing system 130, or other system in FIG. 1. In some aspects, one or more operations shown in FIG. 7 may be omitted or performed in a different order. Similarly, additional operations not shown in FIG. 7 may be performed.

Example Technical Platforms

Aspects of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example aspects, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

According to various aspects, a non-volatile computer-readable storage medium may include a floppy disk, flexible disk, hard disk, solid-state storage (SSS) (e.g., a solid-state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

According to various aspects, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where various aspects are described to use a computer-readable storage medium, other types of computer-readable storage media may be substituted for or used in addition to the computer-readable storage media described above.

Various aspects of the present disclosure may also be implemented as methods, apparatuses, systems, computing devices, computing entities, and/or the like. As such, various aspects of the present disclosure may take the form of a data structure, apparatus, system, computing device, computing entity, and/or the like executing instructions stored on a computer-readable storage medium to perform certain steps or operations. Thus, various aspects of the present disclosure also may take the form of entirely hardware, entirely computer program product, and/or a combination of computer program product and hardware performing certain steps or operations.

Various aspects of the present disclosure are described below with reference to block diagrams and flowchart illustrations. Thus, each block of the block diagrams and flowchart illustrations may be implemented in the form of a computer program product, an entirely hardware aspect, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some examples of aspects, retrieval, loading, and/or execution may be performed in parallel such that multiple instructions are retrieved, loaded, and/or executed together. Thus, such aspects can produce specially configured machines performing the steps or operations specified in the block diagrams and flowchart illustrations. Accordingly, the block diagrams and flowchart illustrations support various combinations of aspects for performing the specified instructions, operations, or steps.

Example System Architecture

Figure 9:
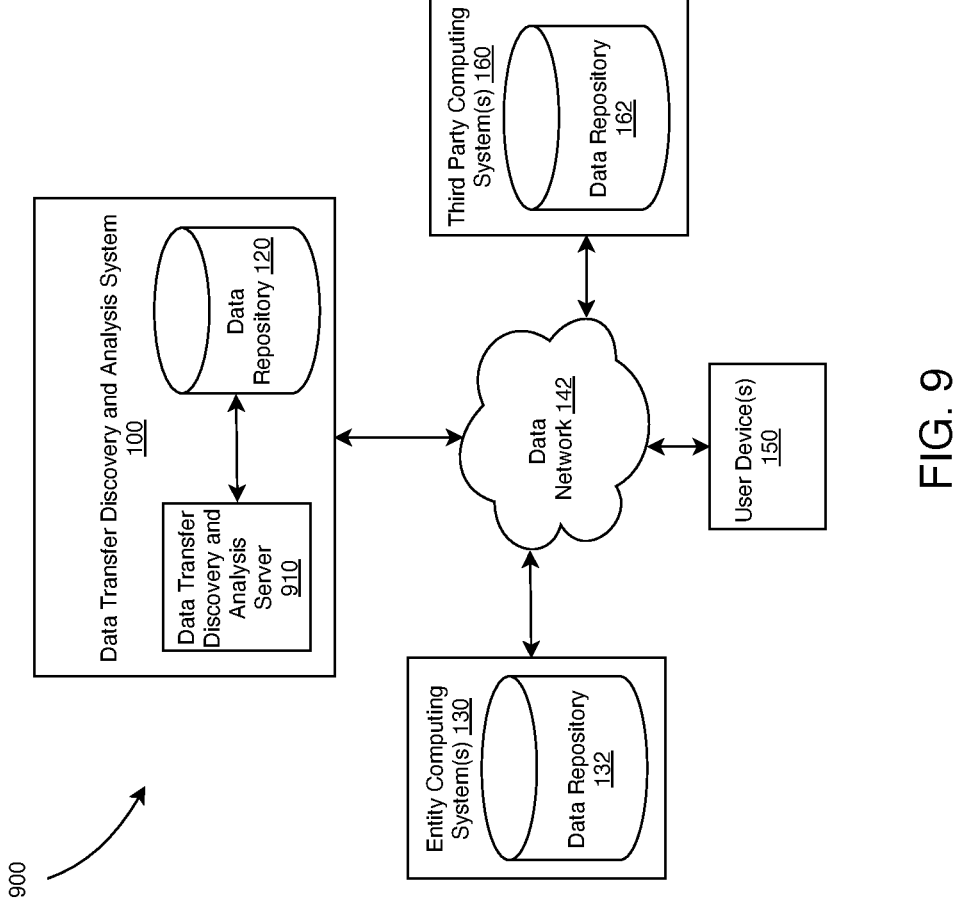
FIG. 9 depicts an example of a system architecture that may be used in accordance with various aspects of the present disclosure.

FIG. 9 is an example of a computing environment 900 depicts an example of a computing environment that can be used for analyzing system access credentials to identify system-to-system data permissions in accordance with various aspects of the present disclosure. Components of the system architecture 900 are configured according to various aspects to discover credentials for access between computing systems, scan those credentials to identify permissions, classify the permissions, and store metadata related to identified intersystem access permissions.

The system architecture 900 according to various aspects may include a data transfer discovery and analysis system 100 and one or more data repositories 120. The data transfer discovery and analysis system 100 further includes a data transfer discovery and analysis server 910. Although the data transfer discovery and analysis system 100 and one or more data repositories 120 are shown as separate components, according to other aspects, these components may include a single server and/or repository, servers and/or repositories, one or more cloud-based servers and/or repositories, or any other suitable configuration.

In addition, the system architecture 900 according to various aspects may include an entity computing system 130 that includes one or more data repositories 132 and third-party computing system(s) 160 comprising one or more data repositories 162. Although the entity computing system 130, third-party computing system 160, and one or more data repositories 132, 162 are shown as separate components, according to other aspects, these components 130, 132, 160, 162 may include a single server and/or repository, servers and/or repositories, one or more cloud-based servers and/or repositories, or any other suitable configuration.

In addition, the system architecture 600 according to various aspects may include a user device 150. The data transfer discovery and analysis server 910 and/or other components may communicate with, access, and/or the like with each other over one or more networks, such as via a data network 142 (e.g., a public data network, a private data network, etc.). In some aspects, the data transfer discovery and analysis server 910 may provide one or more interfaces that allow the entity computing system 130, user device 150, the third-party computing system, and/or the data transfer discovery and analysis system 100 to communicate with each other, such as via one or more suitable application programming interfaces (APIs), direct connections, and/or the like.

Example Computing Hardware

Figure 10:
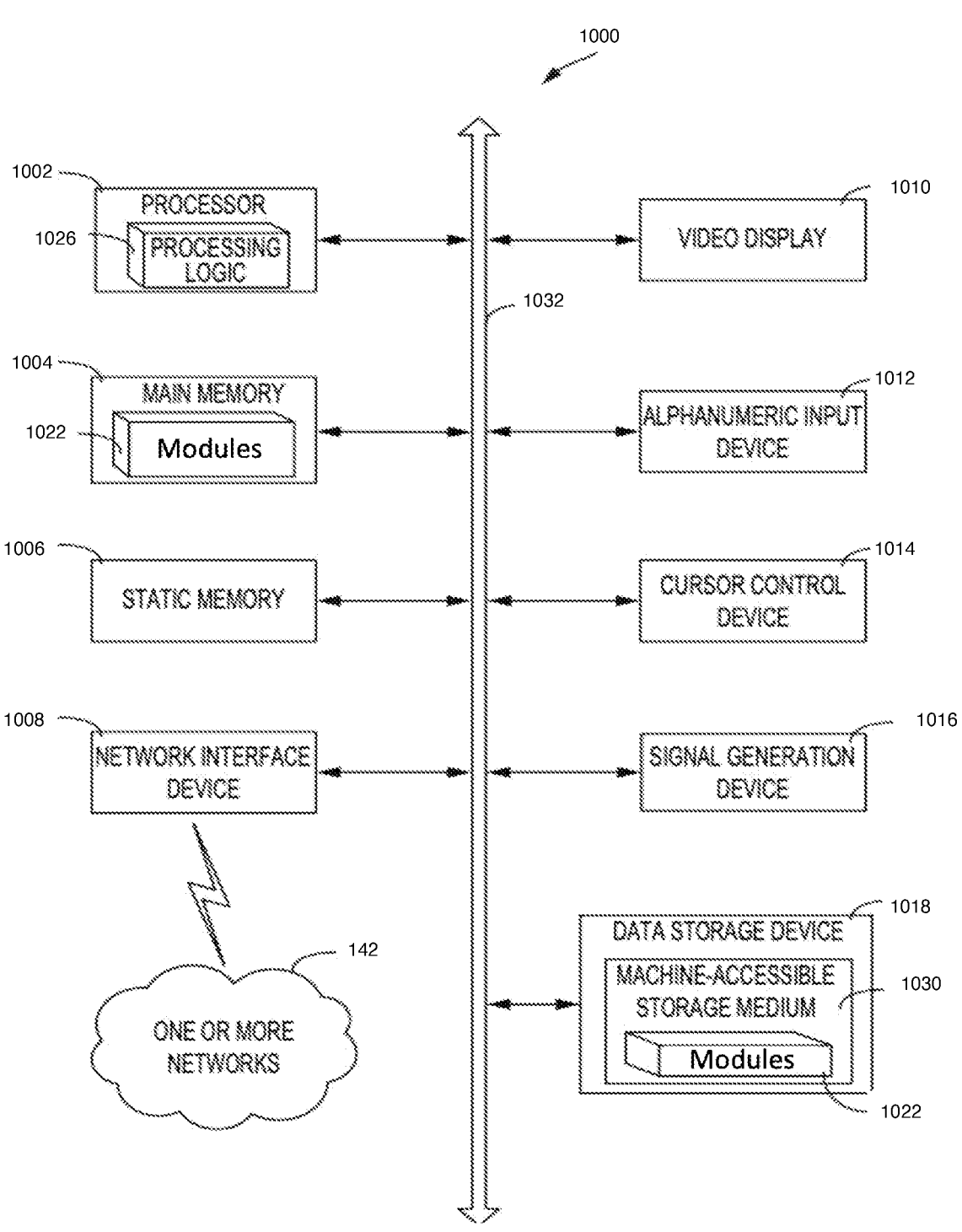
FIG. 10 depicts an example of a computing entity that may be used in accordance with various aspects of the present disclosure.

FIG. 10 illustrates a diagrammatic representation of a computing hardware device 1000 that may be used in accordance with various aspects of the disclosure. For example, the hardware device 1000 may be computing hardware such as a data transfer discovery and analysis server 910 as described in FIG. 9. According to particular aspects, the hardware device 1000 may be connected (e.g., networked) to one or more other computing entities, storage devices, and/or the like via one or more networks such as, for example, a LAN, an intranet, an extranet, and/or the Internet. As noted above, the hardware device 1200 operate in the capacity of a server and/or a client device in a client-server network environment, or as a peer computing device in a peer-to-peer (or distributed) network environment. According to various aspects, the hardware device 1000 may be a personal computer (PC), a tablet PC, a set-top box (STB), a Personal Digital Assistant (PDA), a mobile device (smartphone), a web appliance, a server, a network router, a switch or bridge, or any other device capable of executing a set of instructions (sequential or otherwise) that specify actions to be taken by that device. Further, while only a single hardware device 1000 is illustrated, the term "hardware device," "computing hardware," and/or the like shall also be taken to include any collection of computing entities that individually or jointly execute a set (or multiple sets) of instructions to perform any one or more of the methodologies discussed herein.

A hardware device 1000 includes a processor 1002, a main memory 1004 (e.g., read-only memory (ROM), flash memory, dynamic random-access memory (DRAM) such as synchronous DRAM (SDRAM), Rambus DRAM (RDRAM), and/or the like), a static memory 1006 (e.g., flash memory, static random-access memory (SRAM), and/or the like), and a data storage device 1018, that communicate with each other via a bus 1032.

The processor 1002 may represent one or more general-purpose processing devices such as a microprocessor, a central processing unit, and/or the like. According to some aspects, the processor 1002 may be a complex instruction set computing (CISC) microprocessor, reduced instruction set computing (RISC) microprocessor, very long instruction word (VLIW) microprocessor, a processor implementing other instruction sets, processors implementing a combination of instruction sets, and/or the like. According to some aspects, the processor 1002 may be one or more special-purpose processing devices such as an application specific integrated circuit (ASIC), a field programmable gate array (FPGA), a digital signal processor (DSP), network processor, and/or the like. The processor 1002 can execute processing logic 1226 for performing various operations and/or steps described herein.

The hardware device 1000 may further include a network interface device 1008, as well as a video display unit 1010 (e.g., a liquid crystal display (LCD), a cathode ray tube (CRT), and/or the like), an alphanumeric input device 1012 (e.g., a keyboard), a cursor control device 1014 (e.g., a mouse, a trackpad), and/or a signal generation device 1216 (e.g., a speaker). The hardware device 1000 may further include a data storage device 1018. The data storage device 1218 may include a non-transitory computer-readable storage medium 1030 (also known as a non-transitory computer-readable storage medium or a non-transitory computer-readable medium) on which is stored one or more modules 1022 (e.g., sets of software instructions) embodying any one or more of the methodologies or functions described herein. For instance, according to particular aspects, the modules 1022 include a data transfer discovery and analysis module 200 and/or an access log analysis module 600 as described herein. The one or more modules 1022 may also reside, completely or at least partially, within main memory 1004 and/or within the processor 1002 during execution thereof by the hardware device 1000—main memory 1004 and processor 1002 also constituting computer-accessible storage media. The one or more modules 1022 may further be transmitted or received over a network 142 via the network interface device 1008.

While the computer-readable storage medium 1030 is shown to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding, and/or carrying a set of instructions for execution by the hardware device 1000 and that causes the hardware device 1000 to perform any one or more of the methodologies of the present disclosure. The term "computer-readable storage medium" should accordingly be understood to include, but not be limited to, solid-state memories, optical and magnetic media, and/or the like.

System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, steps, structural devices, acts, or modules. These states, operations, steps, structural devices, acts, and modules may be implemented in software, in firmware, in special purpose digital logic, and any combination thereof. Greater or fewer operations may be performed than shown in the figures and described herein. These operations also may be performed in a different order than those described herein.

CONCLUSION

The disclosure provided herein entails detecting and addressing changes made to regulatory frameworks that affect (may affect) computing systems of various entities. However, those of ordinary skill in the art should appreciate that aspects of the disclosure may be used in detecting and addressing changes made to other regulatory instruments such as regulatory laws, regulations, standards, and/or the like that may also affect computing systems of various entities in handling certain types of data (e.g., target data).

While this specification contains many specific aspect details, these should not be construed as limitations on the scope of any invention or of what may be claimed, but rather as descriptions of features that may be specific to particular aspects of particular inventions. Certain features that are described in this specification in the context of separate aspects also may be implemented in combination in a single aspect. Conversely, various features that are described in the context of a single aspect also may be implemented in multiple aspects separately or in any suitable sub-combination. Moreover, although features may be described above as acting in certain combinations and even initially claimed as such, one or more features from a claimed combination may in some cases be excised from the combination, and the claimed combination may be a sub-combination or variation of a sub-combination.

Similarly, while operations are described in a particular order, this should not be understood as requiring that such operations be performed in the particular order described or in sequential order, or that all described operations be performed, to achieve desirable results. In certain circumstances, multitasking and parallel processing may be advantageous. Moreover, the separation of various components in the various aspects described above should not be understood as requiring such separation in all aspects, and the described program components (e.g., modules) and systems may be integrated together in a single software product or packaged into multiple software products.

Many modifications and other aspects of the disclosure will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for the purposes of limitation.

What is claimed is:

1. A computer-implemented method comprising:

classifying, by computing hardware, one or more access permission types of one or more access permissions provided by an access credential granted to a third-party computing system in connection with one or more data object types or one or more operations of an entity computing system;

determining, by the computing hardware and by inspecting an access log associated with the entity computing system, access activity for the access credential, wherein the access activity comprises one or more entries of the access log that indicate actual access of one or more data objects by the third-party computing system under the access credential to carry out one or more actual data transfers between the entity computing system and the third-party computing system;

identifying that a potential data transfer is not associated with the one or more actual data transfers indicated by the access activity, wherein the potential data transfer represents configurations for data transfers that are allowed under an access permission type of the one or more access permission types, wherein identifying that the potential data transfer is not associated with the one or more actual data transfers comprises:

determining that the potential data transfer corresponds to the access permission type; and determining the access activity does not identify an actual data transfer between the entity computing system and the third-party computing system defined by the access permission type; and causing, by the computing hardware in response to the potential data transfer not being associated with the one or more actual data transfers, the entity computing system to modify the access credential by modifying the access permission type for the access credential.

2. The computer-implemented method of claim 1, wherein causing the entity computing system to modify the access credential comprises causing the entity computing system to rescind the access credential.

3. The computer-implemented method of claim 1, wherein causing the entity computing system to modify the access credential comprises causing the entity computing system to remove an access permission of the access permission type for the access credential.

4. The computer-implemented method of claim 1, wherein determining the access activity comprises determining an amount of data accessed on the entity computing system by a plurality of third-party computing systems comprising the third-party computing system under the access credential, a frequency of data access on the entity computing system by the plurality of third-party computing systems under the access credential, and access permissions utilized by each of the plurality of third-party computing systems under the access credential.

5. The computer-implemented method of claim 1, wherein classifying the one or more access permission types of the one or more access permissions provided by the access credential comprises:

classifying a first access permission of the access credential with a first access permission type associated with a data object or an operation; and classifying a second access permission of the access credential with a second access permission type associated with the data object or the operation.

6. The computer-implemented method of claim 5, wherein causing the entity computing system to modify the access credential further comprises:

determining that the access activity with respect to the first access permission type does not exceed an activity threshold; and causing the entity computing system to modify the first access permission of the access credential in response to the access activity with respect to the first access permission type not exceeding the activity threshold.

7. The computer-implemented method of claim 1, further comprising generating a mapping of data transfers between the entity computing system and the third-party computing system by:

generating the mapping to include the one or more actual data transfers between the entity computing system and the third-party computing system according to the access activity; and generating the mapping to include a plurality of potential data transfers between the entity computing system and the third-party computing system according to the one or more access permissions provided by the access credential.

8. The computer-implemented method of claim 1, wherein classifying the one or more access permission types comprises:

generating, utilizing an ensemble of classifiers, a plurality of probabilities of access permission types corresponding to an access permission of the access credential in connection with a particular data object; and assigning a particular access permission type to the access permission of the access credential for the particular data object based on a corresponding probability exceeding a probability threshold.

9. A system comprising:

computing hardware configured to:

query an entity computing system to determine access credentials indicating access permissions granted to a third-party computing system in connection with one or more data object types or one or more operations of the entity computing system;

classify, utilizing a classification engine, access permission types of the access permissions provided by the access credentials granted to the third-party computing system;

determine, by inspecting an access log associated with the entity computing system, access activity for the access credentials, wherein the access activity comprises one or more entries of the access log that indicate actual access of one or more data objects by the third-party computing system under the access credentials to carry out one or more actual data transfers between the entity computing system and the third-party computing system;

identify, that a potential data transfer is not associated with the one or more actual data transfers between the entity computing system and the third-party computing system indicated by the access activity, wherein the potential data transfer represents configuration for data transfers that are allowed under an access permission type of the access permission types, wherein identifying that the potential data transfer is not associated with the one or more actual data transfers comprises:

determining that the potential data transfer corresponds to the access permission type; and determining the access activity does not identify an actual data transfer between the entity computing system and the third-party computing system defined by the access permission type; and determine that an access credential of the access credentials is underutilized for the entity computing system in response to determining that the potential data transfer allowed under the access permission type is not associated with the one or more actual data transfers according to a mapping; and the entity computing system, wherein the entity computing system is communicatively coupled to the computing hardware and is configured to modify the access credential determined by the computing hardware to be underutilized by (a) rescinding the access credential or (b) modifying the access permission type for the access credential.

10. The system of claim 9, wherein the entity computing system is configured to modify the access permission type by removing an access permission of the access permission type for the access credential in connection with the one or more data object types or the one or more operations of the entity computing system.

11. The system of claim 9, wherein the computing hardware is configured to cause the system to determine the access activity by determining a volume of data accessed under the access credential, a number of times data was accessed under the access credential, or one or more access permissions utilized under the access credential.

12. The system of claim 9, wherein the computing hardware is configured to cause the system to classify the access permission types of the access permissions provided by the access credential by:

classifying each access permission of the access credential as one of a plurality of access permission types in connection with the one or more data object types or the one or more operations; and generating a data structure comprising a corresponding access permission type of each access permission of the access credential, wherein the data structure is organized according to the access permission types.

13. The system of claim 9, wherein:

the computing hardware is configured to cause the system to cause the entity computing system to modify the access credential by determining that the access activity with respect to the access permission type of the access permission types does not exceed an activity threshold; and the entity computing system is configured to modify the access permission type of the access permission types for the access credential based on the access activity with respect to the access permission type of the access permission types not exceeding the activity threshold.

14. The system of claim 9, wherein the computing hardware is configured to cause the system to generate the mapping of data transfers between the entity computing system and the third-party computing system by:

generating the mapping to include a plurality of potential data transfers between the entity computing system and the third-party computing system according to the access permissions provided by the access credentials; and

modify the mapping to include the one or more actual data transfers between the entity computing system and the third-party computing system according to the access activity.

15. A non-transitory computer readable medium comprising instructions that, when executed by computing hardware, cause the computing hardware to perform operations comprising:

classify one or more access permission types of one or more access permissions provided by an access credential granted to a third-party computing system in connection with one or more data object types or one or more operations of an entity computing system;

determine, by inspecting an access log associated with the entity computing system, access activity for the access credential, wherein the access activity comprises one or more entries of the access log that indicate actual access of one or more data objects by the third-party computing system under the access credential to carry out one or more actual data transfers between the entity computing system and the third-party computing system;

identify that a potential data transfer is not associated with the one or more actual data transfers indicated by the access activity, wherein the potential data transfer represents configurations for data transfers that are allowed under an access permission type of the one or more access permission types, wherein identifying that the potential data transfer is not associated with the one or more actual data transfers comprises:

determining that the potential data transfer corresponds to the access permission type; and determining the access activity does not identify an actual data transfer between the entity computing system and the third-party computing system defined by the access permission type; and cause, in response to the potential data transfer not being associated with the one or more actual data transfers, the entity computing system to modify the access credential by modifying the access permission type for the access credential.

16. The non-transitory computer readable medium of claim 15, wherein causing the entity computing system to modify the access credential comprises causing the entity computing system to rescind the access credential.

17. The non-transitory computer readable medium of claim 15, wherein causing the entity computing system to modify the access credential comprises causing the entity computing system to remove an access permission of the access permission type for the access credential.

18. The non-transitory computer readable medium of claim 15, wherein causing the entity computing system to modify the access credential further comprises:

determining that the access activity with respect to the access permission type associated with the potential data transfer does not exceed an activity threshold; and causing the entity computing system to modify the access credential in response to the access activity with respect to the access permission type associated with the potential data transfer not exceeding the activity threshold.

19. The non-transitory computer readable medium of claim 15, wherein the instructions that, when executed by the computing hardware, further cause the computing hardware to perform the operations further comprising generating a mapping of data transfers between the entity computing system and the third-party computing system.

20. The non-transitory computer readable medium of claim 19, wherein generating the mapping of data transfers between the entity computing system and the third-party computing system comprises:

generating the mapping to include the one or more actual data transfers between the entity computing system and the third-party computing system according to the access activity; and generating the mapping to include a plurality of potential data transfers between the entity computing system and the third-party computing system according to the one or more access permissions provided by the access credential.

* * * * *